(12) United States Patent
Wang et al.

(10) Patent No.: US 9,284,470 B2
(45) Date of Patent: Mar. 15, 2016

(54) AQUEOUS DISPERSIBLE POLYMER COMPOSITION

(75) Inventors: Shaofeng Wang, Singapore (SG); Zeling Dou, Singapore (SG); Swee How Seow, Singapore (SG); Jingqiu Li, Singapore (SG); Thomas F. Choate, Pinkney, MI (US)

(73) Assignee: NIPSEA TECHNOLOGIES PTE LTD, Singapore (SG)

(*) Notice: Subject to any disclaimer, the term of this patent is extended or adjusted under 35 U.S.C. 154(b) by 79 days.

(21) Appl. No.: 14/238,540

(22) PCT Filed: Aug. 22, 2012

(86) PCT No.: PCT/SG2012/000297
§ 371 (c)(1),
(2), (4) Date: Jun. 16, 2014

(87) PCT Pub. No.: WO2013/028134
PCT Pub. Date: Feb. 28, 2013

(65) Prior Publication Data
US 2014/0316044 A1   Oct. 23, 2014

(30) Foreign Application Priority Data

Aug. 23, 2011  (GB) .................................. 1114542.2

(51) Int. Cl.
| | |
|---|---|
| *C09D 167/00* | (2006.01) |
| *C09D 175/04* | (2006.01) |
| *C08G 18/66* | (2006.01) |
| *C08G 18/08* | (2006.01) |
| *C08J 3/24* | (2006.01) |
| *C08G 18/32* | (2006.01) |
| *C08G 83/00* | (2006.01) |
| *C09D 201/00* | (2006.01) |
| *C08L 101/00* | (2006.01) |
| *C09D 179/08* | (2006.01) |

(52) U.S. Cl.
CPC .......... *C09D 167/00* (2013.01); *C08G 18/0866* (2013.01); *C08G 18/3212* (2013.01); *C08G 18/664* (2013.01); *C08G 83/004* (2013.01); *C08J 3/243* (2013.01); *C08L 101/005* (2013.01); *C09D 175/04* (2013.01); *C09D 179/08* (2013.01); *C09D 201/005* (2013.01); *C08L 2205/02* (2013.01)

(58) Field of Classification Search
CPC .............. C09D 167/00; C09D 175/04; C09D 201/005; C09D 2205/02; C09D 179/08; C08G 18/664; C08G 18/0866; C08G 18/3212; C08G 83/004; C08J 3/343
USPC ................................................... 524/251, 383
See application file for complete search history.

(56) References Cited

U.S. PATENT DOCUMENTS

| | | | |
|---|---|---|---|
| 6,284,233 B1 * | 9/2001 | Simon ..................... | A61K 8/645 424/401 |
| 6,806,314 B2 | 10/2004 | Fenn | |
| 2008/0274149 A1 * | 11/2008 | Seiler et al. ................... | 424/401 |

FOREIGN PATENT DOCUMENTS

| | | | |
|---|---|---|---|
| JP | 2009-227801 A | | 10/2009 |
| JP | 2009227801 A | * | 10/2009 |
| WO | WO 2007104654 A1 | * | 9/2007 |
| WO | 2010/072527 A1 | | 7/2010 |
| WO | WO 2010072527 A1 | * | 7/2010 |
| WO | 2010/102891 A2 | | 9/2010 |
| WO | WO 2010102891 A2 | * | 9/2010 |
| WO | 2012/066520 A1 | | 5/2012 |

OTHER PUBLICATIONS

International Search Report for PCT/SG2012/000297, dated Oct. 31, 2012, 4 pages.
International Preliminary Report on Patentability for PCT/SG2012/000297, dated Sep. 25, 2013, 5 pages.
Seiler, M., et al, "From Alcohols to Hyperbranched Polymers: The Influence of Differently Branched Additives on the Vapour-Liquid Equilibria of Selected Azeotropic Systems", J. Chem. Eng. Data, 2003, 48, 933-937.

* cited by examiner

*Primary Examiner* — Michael M Bernshteyn
(74) *Attorney, Agent, or Firm* — Hovey Williams LLP

(57) ABSTRACT

There is provided an aqueous dispersible polymer composition comprising: (i) a hydroxyl functional dendritic polymer; (ii) one or more polar compounds, the polar compounds being miscible with both the hydroxyl functional dendritic polymer and an aqueous solvent; and wherein the one or more polar compounds are present in an amount sufficient to disperse the hydroxyl functional dendritic polymer in the aqueous solvent. There is also provided a coating composition comprising the same and processes for preparing the aqueous dispersible polymer composition and the coating composition.

22 Claims, 7 Drawing Sheets

AQUEOUS DISPERSIBLE POLYMER COMPOSITION

RELATED APPLICATION

The present application is a national stage application under 35 U.S.C. §371 of International Application No. PCT/SG2012/000297, filed Aug. 22, 2012, which is incorporated by reference herein in its entirety.

TECHNICAL FIELD

The present invention relates to an aqueous dispersible polymer composition, methods of preparing the same and uses thereof.

BACKGROUND

Dendritic polymers have been used in the field of manufacturing protective coatings due to their unique structure which leads to the formation of high performance coatings. Protective coatings offer protection for a surface from damage by the elements such as water, snow, ice, heat, dirt, smog, organic waste, chemical attacks and acid precipitation.

As dendritic polymers are hyperbranched structures which can comprise a high number of reactive functional groups exposed at the peripheral edges of the dendritic polymer, they are considered as one of most promising resin systems for providing coating films having high cross-linking density and high surface protection performance.

Depending on the degree of branching, dendritic polymers may be classified into first, second, third, fourth or even fifth generation dendritic polymers. A first generation dendritic polymer may theoretically have a total of eight peripheral reactive functional groups, whereas a second generation polymer will have theoretically sixteen peripheral functional groups, and whereas a third generation polymer will theoretically have thirty two peripheral functional groups and so forth. The total number of peripheral functional groups per molecule is also referred to as the peripheral functionality.

Dendritic polymers can mimic the hydrodynamic volumes of spheres, and as such, they can be used to provide coatings of high molecular weights whilst maintaining relatively low viscosity. At the same time, dendritic polymers can be used to provide coatings with high cross-linking density while maintaining the flexibility of the coating.

Conventionally, protective coatings comprising dendritic polymers are provided as organic solvent-based coating systems due to the dendritic polymer's lack of solubility in water.

Such solvent-based systems provide excellent abrasion resistance, flexibility, adhesion, and chemical resistance. However, due to the presence of organic solvents which are volatile in nature, coatings prepared from solvent-based systems will typically emit an undesirably high level of volatile organic compounds ("VOC"). In recent years, ever stricter regulatory requirements in many countries have driven coating manufacturers to explore the possibilities of coating compositions that have low VOC emission levels. Thus, water-based coatings that do not involve the use of organic solvents have been contemplated in the art.

However, due to the hydrophobic nature of large polymers like dendritic polymers, at least some amount of ionic content is required to be grafted onto these polymers to allow the polymer compositions to be soluble in water.

One known method for incorporating ionic groups onto dendritic polymers is by reacting hydroxyl functional dendritic polymers with acid anhydrides followed by neutralization of the mixture. In this method, carboxyl groups are grafted onto the peripheral surface of the dendritic polymers to improve its solubility in water. In one known water-based dendritic polymer coating, the coating comprises a fluorine-containing dendritic polymer having at least one pendant fluorocarbon moiety and at least one pendant anionic moiety. Presumably, the presence of the anionic moieties improves the solubility of the dendritic polymer in water.

However, this additional modification step is cumbersome and results in added expenditure related to the procurement of required chemicals and solvents, for performing the modification step. Furthermore, some of the required chemicals and solvents are organic pollutants and their disposal would pose a problem logistically and environmentally.

More importantly, it has been observed that the incorporation of excess ionic groups, for example carboxyl groups, will adversely affect coating performance, especially with respect to the chemical resistance and water resistance of the coating.

Accordingly, there is a need to provide a polymer composition that overcomes, or at least ameliorates, one or more of the disadvantages described above.

In particular, it is an object of the present invention to provide an aqueous dispersible polymer composition that does not require an additional modification step for achieving solubility in an aqueous solvent, and at the same time, being capable of providing coatings that exhibit comparable, if not superior, performance when compared with conventional water-based coatings.

SUMMARY

In a first aspect, there is provided an aqueous dispersible polymer composition comprising: (i) a hydroxyl functional dendritic polymer; (ii) one or more polar compounds, said polar compounds being miscible with both said hydroxyl functional dendritic polymer and an aqueous solvent; wherein the one or more polar compounds are present in an amount sufficient to disperse the hydroxyl functional dendritic polymer in the aqueous solvent.

Advantageously, the dendritic polymer is capable of being dispersed in an aqueous solvent without the need to functionalize the peripheral surface of the dendritic polymer with one or more ionic groups.

It has been observed that when the dendritic polymer has been functionalized with ionic groups, such as carboxyl groups, the performance of a coating prepared from the functionalized dendritic polymer may exhibit inferior chemical/water resistance, when compared to a coating prepared from a dendritic polymer that has not been functionalized with pendant ionic groups. Conversely, a dendritic polymer that has not been functionalized is incapable of being dispersed in an aqueous solvent and tends to experience phase separation when mixed with an aqueous solvent. This results in an unstable polymer composition that cannot be readily, if at all, formed into a coating film.

Advantageously, the aqueous dispersible polymer composition disclosed herein avoids the abovementioned drawbacks by being capable of dispersing in an aqueous solvent without requiring functionalization with ionic moieties. Hence, the disclosed polymer compositions may also be used to prepare water-based coatings having superior coating performance, particularly, in terms of chemical and water resistance. Also advantageously, the disclosed aqueous dispersible polymer composition is stable in admixture with an aqueous solvent and can be readily mixed with cross-linkers to form a coating composition.

In a second aspect, there is provided an aqueous polymer dispersion comprising: (i) a hydroxyl functional dendritic polymer; (ii) one or more polar compounds, said polar compounds being miscible with both said hydroxyl functional dendritic polymer and an aqueous solvent; and (iii) an aqueous solvent. In one embodiment, the aqueous solvent is water.

Advantageously, the aqueous polymer dispersion is stable for prolonged storage and does not suffer from phase separation. Also advantageously, there is no requirement to functionalize the dendritic polymer to provide the above disclosed polymer dispersion. Hence, the process of obtaining the aqueous polymer dispersion is simplified and results in time/cost savings. As also discussed, the disclosed aqueous polymer dispersion can be used to prepare an aqueous phase coating such as, a water-based coating, that demonstrates superior chemical/water resistance, compared to a water-based coating prepared from an aqueous polymer dispersion, wherein the dendritic polymer has been functionalized with, ionic groups.

In a third aspect, there is provided a two-component coating composition comprising a first and second component, said first component comprising: (i) a hydroxyl functional dendritic polymer; (ii) one or more polar compounds, said polar compounds being miscible with both said hydroxyl functional dendritic polymer and an aqueous solvent; (iii) water; and said second component comprising (iv) one or more cross-linkers; wherein the first and second components are mixed together to form the two-component coating composition.

In a fourth aspect, there is provided a process for preparing an aqueous dispersible polymer composition, the process comprising the steps of (a) mixing a hydroxyl functional dendritic polymer, one or more polar compounds in an aqueous solvent to form the aqueous dispersible polymer composition, wherein the one or more polar compounds are being selected to be miscible with both the hydroxyl functional dendritic polymer and the aqueous solvent; and wherein the one or more polar compounds are provided in an amount sufficient to disperse the hydroxyl functional dendritic polymer in the aqueous solvent.

In a fifth aspect, there is provided the aqueous dispersible polymer composition as defined above for use in the preparation of a single component coating composition.

In a sixth aspect, there is provided the aqueous dispersible polymer composition as defined above for use in preparation of a two-part coating composition.

In a seventh aspect, there is provided a process for preparing an aqueous dispersion of a hydroxyl functional dendritic polymer comprising the steps of (a) contacting a hydroxyl functional dendritic polymer with at least one polar compound to form a first component; (b) contacting the first component with an aqueous solvent to form the aqueous dispersion of a hydroxyl functional dendritic polymer; wherein the polar compound is miscible with the aqueous solvent and the hydroxyl functional dendritic polymer; and wherein the polar compound is provided in an amount sufficient to disperse the hydroxyl functional dendritic polymer in the aqueous solvent.

DEFINITIONS

The following words and terms used herein shall have the meaning indicated:

The term "polar compound" as used in the context of the present specification shall be taken to refer to compounds having one or more polar functional groups having an unequal charge distribution about one or more covalent bonds, due to the differences in the electro-negativity of the atoms sharing the covalent bonds. Exemplary polar functional groups include but are not limited to hydroxyl groups (—OH), carbonyl groups (—C=O), carboxyl groups (—COOH), amino groups (—NR), and halogenated alkyl groups.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5 of the stated value, more typically +/−4% of the stated value, more typically +/−3% of the stated value, more typically, +/−2% of the stated value, even more typically +/−1% of the stated value, and even more typically +/−0.5% of the stated value.

As used herein, the term "dendritic polymer" refers to a three-dimensional macromolecular material comprising a polyvalent core that is covalently bonded to a plurality of dendrons (or tree-like structures). The term "dendron" means a tree-like structure having multiple branching layers (or "generations") that emanates from a focal point, such as a polyvalent core. Each succeeding branching layer or generation of a dendron extends from the prior generation, and each branching layer or generation in the dendron has one or more terminal reactive sites (or "terminal functional groups") from which the succeeding generation (if any) may extend, or in the case of the last generation, which may provide a terminal functional group on the dendritic polymer. Dendritic polymers generally have a large number of terminal functional groups, lack entanglements, and have a low hydrodynamic volume. Further, as used herein, the term "dendritic polymer" includes both "dendrimers" and "hyperbranched polymers". In certain embodiments, the term "dendritic polymer" includes solely hyperbranched Polymers. As used herein, the term "dendrimer" refers to a dendritic polymer having a symmetrical globular shaped that results from a controlled process giving an essentially monodisperse molecular weight distribution. As used herein, the term "hyperbranched polymer" refers to a dendritic polymer having a certain degree of asymmetry and a polydisperse molecular weight distribution. Hyperbranched polymers may be exemplified by those marketed by Perstorp under the Trademarks Boltorn H20™ Boltorn H30™, Boltorn H40™, etc.

Dendritic polymers can include dendritic polyesters, dendritic polyols, dendritic polyethers, dendritic polyamines, and mixtures thereof. In some instances, the dendritic polymer is a dendritic polyester.

The term "miscible" as used herein refers to a liquid capable of being mixed with another liquid without separation in to two phases. In some instances, two liquids that are miscible can be mixed in any ratio without separation in to two phases. In instances where miscible is used to describe the interaction of a liquid and a solid, miscible refers to a liquid capable of substantially solubilizing the solid. In certain embodiments, the solid is completely soluble in the miscible liquid. In certain embodiments, the solid is greater than about 90%, greater than about 95%, or greater than about 97% soluble in the liquid.

The phrase "hydroxyl functional dendritic polymer" as used herein refers to dendritic polymers having one or more hydroxyl functional groups on the dendritic polymer that are capable of being functionalized with a hydroxyl reactive functional group to form a covalent bond. In some instances, the hydroxyl functional dendritic polymer is substantially unmodified, i.e., 0, 1, 2, 3, 4, 5, 6, 7, 8, 9, 10, 11, 12, or 13 of the hydroxyl functional groups have been reacted with a hydroxyl reactive functional group to form a covalent bond. In some instances, the hydroxyl functional dendritic polymer has about 30%, about 25%, about 20%, about 15%, about 10%, or about 5% of the hydroxyl functional groups modified, i.e., reacted with a hydroxy reactive functional group to form a covalent bond. In some instances the hydroxyl functional dendritic polymer is completely unmodified, i.e., none of the the hydroxyl functional groups have been reacted with a hydroxyl reactive functional group.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from to 6 etc., as well as individual numbers within that range, for example, 1, 2, 3, 4, 5, and 6. This applies regardless of the breadth of the range.

Disclosure of Optional Embodiments

Exemplary, non-limiting embodiments of an aqueous dispersible polymer composition according to the first aspect will now be disclosed.

The aqueous dispersible polymer composition may further comprise an aqueous solvent. In one embodiment, the aqueous solvent is water. In a preferred embodiment, the aqueous solvent is de-ionized water. Advantageously, the disclosed aqueous dispersible polymer compositions can be used to prepare organic solvent-free coatings, which are desirable for their low volatile organic compounds (VOC) emissions and advantageously therefore the compositions are free of any VOC when mixed in an aqueous phase solvent. Further advantageously, the prepared coatings have comparable, if not superior, pencil hardness, chemical resistance and water resistance relative to coatings prepared from conventional water-based polymer compositions.

The weight ratio of the hydroxyl functional dendritic polymer to the one or more polar compounds may be in a range of from about 1:10 to about 10:1.

In one embodiment, the weight ratio of dendritic polymer to the one or more polar compounds may be about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

In one embodiment, the weight ratio of the dendritic polymer to the polar compounds is 1:1. The amount of polar compound may be provided in excess with respect to the dendritic polymer. In one embodiment, the weight ratio of the dendritic polymer to the polar compounds is about 1:2, about 1:4 or about 1:9. Advantageously, it has been found that providing the polar compound in excess greatly decreases the viscosity of the polymer composition and, accordingly, improves the workability of the polymer composition for film formation. Also advantageously, it has been found a polymer composition having the polar compound in excess can still form coatings with comparable qualities (e.g. pencil hardness) when compared to coatings formed from polymer compositions having a higher proportion of dendritic polymer.

In one embodiment, the weight ratio of dendritic polymer to the one or more polar compounds may be from about 1:9 to about 4:1. In another embodiment, the weight ratio of dendritic polymer to the one or more polar compounds may be from about 1:5 to about 5:1. Advantageously, it is has been found that such weight ratios provide optimal solubility in an aqueous medium whilst maintaining good coating performance.

The one or more polar compounds may have an average molecular weight of less than 500. In one embodiment, the one or more polar compounds may have an average molecular weight of less than 400. In yet another embodiment, the one or more polar compounds may have an average molecular weight of less than 300. In still another embodiment, the polar compounds may have an average molecular weight of less than 200. Advantageously, polar compounds having average molecular weight of 500 or less may be more effective with respect to dispersing the dendritic polymer in the aqueous solvent. Without being bound by theory, it is postulated that the small molecular size of the polar compounds increases its solubility in a polar solvent due to its higher specific area for electrostatic interactions between its polar functional groups and the polar groups of the aqueous solvent. This in turn results in an overall increase in solubility of the polymer composition comprising the hydroxyl functional dendritic polymer and the polar compounds.

Advantageously, the polar compound may form strong hydrogen bonds with both the dendritic polymer as well as an aqueous solvent, such as water, and thereby promote the dispersibility of dendritic polymer in water.

In this respect, the one or more polar compounds may comprise one or more functional groups selected from the group consisting of: hydroxyl functional group, amino functional group, halogen functional group, carbonyl functional group, carboxyl functional group and combinations thereof.

In one embodiment, the one or more polar compounds may be selected from the group consisting of alcohols, carboxylic acids, hydroxyl acid, halogenated alkyls, halogenated olefins, amines, alkylamines, alkenylamines, olefinic alcohols, cycloalkyl alcohol, cycloalkenyl alcohol and mixtures thereof. In one embodiment, the polar compound is selected to be an alcohol, such as diols and glycols. In another embodiment, the polar compound is selected to be a cycloalkyl alcohol. In yet another embodiment, the polar compound is selected to be a carboxylic acid.

Where the polar compound comprises hydroxyl functionality, it is preferred that the polar compound comprises at least from about 2 to about 6 hydroxyl functional groups per molecule of the polar compound.

In one embodiment, the polar compounds may comprise from about 2 to about 15 carbon atoms per molecule.

In one embodiment, the polar compound is a low molecular weight, cycloaliphatic diol, such as, cyclopropane alcohol, cyclopropene alcohol, cyclobutane alcohol, cyclopentane alcohol, cyclohexane alcohol, or cycloheptane alcohol. The alcohols may be selected from mono, diol and triol alcohols having from 1 to 7 carbon atoms.

In one embodiment, the polar compound is 1,6-cyclohexane dimethanol.

In one embodiment, the polar compound is lactic acid.

The disclosed polymer composition may further comprise one or more cross-linkers. Any cross-linker compound comprising a functional moiety capable of reacting with the peripheral hydroxyl groups of the dendritic polymer to form covalent bonds, may be used as a cross-linker in the disclosed composition. Exemplary cross-linkers may be selected from, but are not limited to, the group consisting of: polyisocyanates, blocked polyisocyanates, melamine formaldehyde resins, epoxy resins, carbodiimide compounds, and aziridine-functional compounds.

In one embodiment, the functional moiety may be an aliphatic or aromatic isocyanate comprising the cross-linkable moiety (—N=C=O). In one embodiment, the cross-linker may have a general formula R—N=C=O, wherein R may be selected from substituted or non-substituted, aliphatic or aromatic alkyls, alkenyls, aryls and the like.

In another embodiment, the cross-linker may be a diisocyanate having a general formula O=C=N—$R_1$—$R_2$—N=C=O, wherein $R_1$ and $R_2$, being same or different, may be independently selected from substituted or non-substituted, aliphatic or aromatic, alkyls, alkenyls, aryls and the like.

In one embodiment, the cross-linker is selected from the group consisting of: diphenylmethane 4,4'-diisocyanate, methylenebis-4,4'-isocyanatocyclohexane, 1,6-hexamethylene diisocyanate (HDI), 1,4-cyclohexane diisocyanate, p-phenylene diisocyanate, triphenylmethane-4,4',4",-triioscyanate, methylene diphenyl diisocyanate (MDI), toluene diisocyanate (TDI), tetramethylxylene diisocyanate, isophorone diisocyanate (IPDI) and mixtures thereof. It is preferred that the cross-linkers are high order isocyanates compounds, having at least two, and preferably at least three or four isocyanate moieties for each cross-linker molecule.

The cross-linker may also be a blocked compound wherein its cross-linkable moiety is chemically reacted with a blocking agent to substantially prevent it from reacting with the dendritic polymer. In one embodiment, the cross-linker can be a blocked isocyanate selected from the list disclosed above. The blocked isocyanate may be used in single component (1K) coating compositions wherein the cross-linker is provided in admixture with the aqueous dispersible polymer composition and does not require a separate mixing step prior to applying the composition as a coating onto a surface. In one embodiment, the blocked isocyanate may be freed for reaction via the application of heat.

For example, blocked isocyanates are not used in two-part (2K) coating preparations where the aqueous dispersible polymer composition and the cross-linkers are in two separate compositions and are respectively mixed shortly before applying the resultant coating composition as a coating onto a surface.

The cross-linker may also be selected from melamine formaldehyde resins. In one embodiment, the melamine formaldehyde resin is a hexamethoxymethyl-melamine formaldehyde resin. In another embodiment, the cross-linker may be a melamine resin such as a methylated, butylated melamine resin.

Advantageously, through condensation reactions with the cross-linkers, the disclosed aqueous dispersible polymer compositions are capable of forming water-based coating compositions. In one embodiment, these water-based coatings may be further subjected to a step of heat curing and/or drying to remove the entrained water, to thereby increase the cross-linking density between the dendritic polymers.

The aqueous dispersible polymer composition may further comprise a non-dendritic polymer selected from polyester, polyurethane, polyacrylate, polyol, polyimide, copolymers and polymer blends thereof.

In another embodiment, the aqueous dispersible polymer composition may further comprise one or more acrylate-functional compounds. Advantageously, the acrylate-functional compounds may be capable of forming free radicals upon exposure to ultra-violet radiation, thereby increasing the cross-linking density of the coating composition. Advantageously, the presence of acrylate-functional compounds may allow the water-based coatings to be subject to UV curing.

The hydroxyl functional dendritic polymer may have a theoretical number of about 16 to about 128 peripheral hydroxyl groups per molecule of said dendritic polymer. In one embodiment, the dendritic polymer may have an average number of 20 to about 80 peripheral hydroxyl groups per molecule of dendritic polymer. In one embodiment, the hydroxyl functional dendritic polymer has a theoretical number of 64 hydroxyl groups per molecule of dendritic polymer.

The aqueous dispersible polymer may further comprise one or more additives selected from the group consisting of: catalysts, ultra-violet (UV) photo-initiators, nanoparticles, surfactants, coalescent solvents and mixtures thereof.

The nanoparticles may be metal oxide nanoparticles. In one embodiment, the metal oxide nanoparticles are selected from oxides of aluminum and zinc. Typically, when added into the polymer composition, the average particle size of the nanoparticles ranges from about 1 nm to about 500 nm. In another embodiment, these nanoparticles may be encapsulated within a polymer which has been suitably functionalized for cross-linking with the dendritic polymers.

In one embodiment, the catalyst may be selected from organometallic compounds and tertiary amines. Exemplary catalysts may include a dibutyltin compound, such as dibutyltin dilaurate and dibutyltin diacetate, triethylenediamine (TEDA), triethylamine (TEA), triethanolamine, N,N-dimethylethanolamine (DMEA), N,N-dimethylpiperazine, N-ethylmorpholine. In another embodiment, the catalyst may be a strong acid or a weak acid, such as a sulfonic acid. Exemplary acid catalysts may include dodecylbenzyl sulfonic acid, p-toluenesulfonic acid, dinonylnapthalene disulphonic acid (DNNDSA), dodecyl benzene sulphonic acid (DDBSA), dinonylnapthalene monosulphonic acid (DNNSA), phosphates such as alkyl acid phosphates, metal salts and carboxylic acids. In the embodiment where the cross-linkers used belong to the class of melamine and expoxy resins, acid catalysts are used as catalysts. In the embodiment where the cross-linkers used belong to the class of isocyanates, organometallic compounds and tertiary amines are used as catalysts.

The aqueous dispersible polymer composition may further comprise an alkoxide, the alkoxide having a general formula $M(Z)_n$, wherein n is 3 or 4; M is selected from the group consisting of: Zr, Al, Ti, Sn and Si; and wherein (Z) is a reactive hydrolysable group selected from a halide or an (OR) group, wherein R is hydrogen (H), acetoxy or an alkyl group having 1 to 6 carbon atoms.

In one embodiment, the halide group can be selected from the group consisting of fluoride (F), bromide (Br) chloride (Cl) and iodide (I). In one embodiment, Z is Cl.

In one embodiment, R is selected from methyl, ethyl or phenyl. In another embodiment, R is —$CH_3C$=O (acetoxy).

In one embodiment, the alkoxide may be a siloxane compound having a general formula of $Si(Z)_n$.

The aqueous dispersible polymer composition may further comprise one or more silane compounds. In one embodiment, the silane compounds may comprise at least one reactive group capable of reacting with an inorganic compound and at least one organofunctional group capable of reacting with an organic compound.

In one embodiment, the silane compounds are organosilanes having the general structure:

$$(Z)_3—Si—(CH_2)_n—X$$

wherein (Z) is a reactive hydrolysable group selected from a halide or an (OR) group, wherein R is hydrogen (H), acetoxy or an alkyl group having 1 to 6 carbon atoms;

X is a organofunctional group, selected from amine, amino, amine, hydroxyl, carboxyl, epoxide, methacrylate, mercaptan (SH), alkyl, alkylene, vinyl, isocyanate, carbamate and combinations thereof; and n is an integer from 1 to 10.

In one embodiment, the halide group can be selected from the group consisting of fluoride (F), bromide (Br) chloride (Cl) and iodide (I). In one embodiment, Z is Cl.

In one embodiment, R is selected from methyl, ethyl or phenyl. In another embodiment, R is —CH$_3$C=O (acetoxy).

In one embodiment, the organosilane can be a bifunctional organosilane, that is, having a general formula:

$$(Z^1)_3—Si—(CH_2)_m—X—(CH_2)_n—Si—(Z^2)_3$$

wherein X is as defined above;

(Z$^1$) and (Z$^2$), being same or different, are as defined above; n and m are integers, independently selected from 1 to 10.

In one embodiment, the organosilane compound is a bifunctional trimethoxysilyl aminosilane, wherein X is amino and where (Z$^2$) and (Z$^1$) are methoxy.

In another embodiment, the organosilane compound is a monofunctional trimethoxysilyl epoxysilane, wherein X is epoxy and (Z$^2$) and (Z$^1$) are methoxy.

The silane compounds may be present in an amount of at least about 0.01% by weight based on the total weight of the aqueous dispersible polymer composition. In another embodiment, the silane compounds may be in an amount from about 0.01% to about 10% by weight based on the total weight of the polymer composition. In yet another embodiment, the silane compounds may be present in an amount of about 25%, about 30%, about 35%, about 40%, about 45%, about 50%, about 55%, about 60%, about 65%, about 70%, about 75%, about 80%, about 85%, about 90% or about 95% by weight, based on the total weight of the polymer composition.

Advantageously, the silane compounds may help to improve the adhesion properties of a coating formed from the disclosed aqueous dispersible polymer composition. In particular, the silane compounds may improve the ability of the formed coating to adhere to inorganic substrates, such as glass, metal, minerals or ceramics. Further advantageously, the silane compounds may also act as cross-linkers to promote cross-linking between the dendritic polymers, thereby increasing the cross-linking density. As a result, the formed coatings may exhibit improved hardness, chemical and moisture resistance In certain embodiments, the aqueous dispersible polymer composition may also include one or more polymers selected from the group consisting of aliphatic polyester, cyclic polyester, cyclic aliphatic polyester, polyacrylate, polyurethane, polyester polyol, polyurethane polyol, polyacrylate polyol, polycarbonate, polycarbonate polyol, copolymers and blends thereof.

Exemplary, non-limiting embodiments of a process for preparing an aqueous dispersible polymer composition according to the fourth and seventh aspects will now be disclosed.

During the mixing step (a), the one or more polar compounds may be provided in an amount sufficient to disperse the dendritic polymer in an aqueous solvent. In one embodiment, the polar compounds may be provided in a weight ratio of dendritic polymer to polar compound of from about 1:10 to about 10:1.

In one embodiment, the mixing step (a) may comprise providing a weight ratio of dendritic polymer to polar compounds of about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

In one embodiment, the aqueous solvent is selected to be water. In a preferred embodiment, the aqueous solvent is de-ionized water. The water may be added to the mixture of dendritic polymer and polar compounds in an amount of from about 20% to about 40% by weight based on total weight of the polymer composition. In one embodiment, the water may be added in an amount of about 30% by weight based on the total weight of the polymer composition.

The mixing step (a) may be performed at a temperature of from about 20° C. to about 200° C. In another embodiment, the mixing step (a) may be performed at a temperature of from about 50° C. to about 150° C. In still another embodiment, the mixing step (a) may be performed at a temperature of about 95° C. to about 120° C.

The mixing step (a) may comprise physical blending, wherein the physical blending is performed under rigorous agitation, for instance, by stirring until the polymer solution turns homogeneous.

In certain embodiments, the hydroxyl functional dendritic polymer has a theoretical number of 16 to 128 hydroxyl groups per molecule of said polymer.

In certain embodiments, the hydroxyl functional dendritic polymer has a theoretical number of 16 to 64 hydroxyl groups per molecule of said polymer.

In certain embodiments, the hydroxyl functional dendritic polymer has a theoretical number of 32 to 64 hydroxyl groups per molecule of said polymer.

In certain embodiments, the hydroxyl functional dendritic polymer has a theoretical number of 32 hydroxyl groups per molecule of said polymer.

In certain embodiments, the hydroxyl functional dendritic polymer has a theoretical number of 64 hydroxyl groups per molecule of said polymer.

In certain embodiments, the hydroxyl functional dendritic polymer is a hyperbranched polyester.

In certain embodiments, the polar compound is an alcohol, diol, polyol, or a hydroxyl substituted aliphatic carboxylic acid. In certain embodiments, the polar compound is Unoxol (a mixture of (cis, trans) 1,3 cyclohexanedimethanol and (cis, trans) 1,4-cyclohexanedimethanol)diol, 1,6-hexanediol, lactic acid, ethylene glycol, or polyethylene glycol.

In certain embodiments the process for preparing an aqueous dispersion of a hydroxyl functional dendritic polymer further comprises contacting the aqueous dispersion of a hydroxyl functional dendritic polymer with one or more cross-linkers.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

Figure 1A:
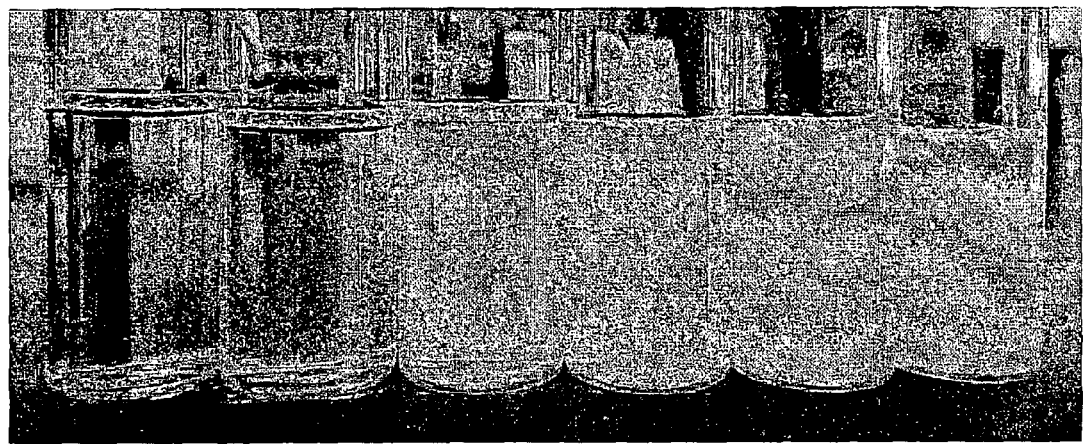
FIG. 1a shows the aqueous dendritic polymer dispersion obtained from Examples 1A to 1F.

Non-limiting examples of the invention will be further described in greater detail by reference to specific Examples, which should not be construed as in any way limiting the scope of the invention.

Materials Used

Below is a list of the raw materials used in the following Examples. The commercial names (in bold) of the following raw chemicals will be used in the Examples for convenience.

1. Dendritic polymer with theoretically 64 peripheral hydroxyl groups, having a molecular weight of about 5100 g/mol solid, OH value 470-500, ("Boltorn H40™") procured from Perstorp Singapore Pte Ltd.

2. Dendritic polymer with theoretically 16 primary hydroxyl groups and a molecular weight of 1747 g/mole solid, OH value 490-530, ("Boltorn H20") produced from Perstorp Singapore Pte Ltd.

3. Cycloaliphatic diol that is composed of approximately a 1:1 ratio of (cis, trans)-1,3-cyclohexanedimethanol and (cis, trans)-1,4-cyclohexanedimethanol, with a molecular weight of 144.21, hydroxyl number of 778, ("Unoxol Diol™") produced from Dow Chemical Pacific (Singapore) Pte Ltd.

4. Water-dispersible, aliphatic polyisocyanate, with —N=C=O (NCO) equivalent weight of about 344 ("Easaqua XD 803") procured from Perstorp Singapore Pte Ltd.

5. A hexamethoxymethyl-melamine-formaldehyde resin, with 98% solid ("Resimene 747") procured from Ineos Melamines, Germany.

6. Pure aliphatic polyurethane dispersion ("PUD 163P") procured from Nipsea Technologies, Singapore, having solids content: 33.8%; Viscosity: 35.5 cps; pH: 7.87; Mw=39673, and Mn=9747.

7. A hexamethoxymethyl/n-butyl-melamine formaldehyde resin, with 98% solids ("Resimene CE7103") procured from Ineos Melamines, Germany.

Testing Methods

In the following Examples, the following industrially recognized testing methods are used to characterize the water-dispersible coatings:

Viscosity (Brookfield LVT viscometer): ASTM D2196-86;
Adhesion (1 mm×1 mm): ASTM D3359;
Impact (as measured in Inch (in)/pounds (lb) (direct)): ASTM D2794;
Pencil Hardness (Break/Scratch): ASTM D3363;
Flexibility (⅛"): ASTM D5222;

In addition, a methyl ethyl ketone ("MEK") rub test is used to determine the degree of cure of the coating composition by the resistance of the composition to MEK.

The following protocol will be adopted for the MEK rub test:

(i) Prepare film on a glass panel with 100 μm wet film thickness ("WFT");

(ii) Dry the panel at a predetermined temperature for a predetermined duration (temperature and curing time depend on specific coatings) prior to testing;

(iii) Saturate a cotton bud with MEK and hold it at 45° angle to the test surface, rub the test surface with moderate pressure. A complete rub consisting of one forwards rub and one backwards rub motion is considered one double rub. The surface is rubbed continuously until the substrate glass panel is exposed. Record the total number of double rubs.

Further, the particle size of the dispersions obtained in the following Examples are tested by a dynamic light scattering (DLS) instrument. DLS observes the time dependent fluctuations in scattering intensity caused by constructive and destructive interference resulting from the relative Brownian movements of the particles within a dispersion sample. Accordingly, the average particle size can be calculated from time-dependent fluctuations in light intensity. The following procedure will be adopted to determine the particle size:

(i) Turn on the analyzer. Ensure the system is warmed up for at least 30 minutes prior to starting the measurement in order to prevent any thermal equilibration issues from affecting the measurement results.

(ii) Add 25 μL sample diluent and 25 ml deionized (D.I.) water into a glass beaker. Dilute sample such that a transparent appearance or slightly milky solution is obtained.

(iii) Fill a cuvette up to a minimum of 10 mm in depth from the bottom of the cuvette for sufficient light scattering.
(iv) Run the measurement
(v) Record results accordingly.

Examples 1A-1F

Preparation of Aqueous Dispersible Dendritic Polymer Composition

Boltorn H40 (powder) and Unoxol Diol were mixed in a 100 ml round bottle flask at varying weight ratios. The mixture turned homogenous after about 1 to 2 hours of stirring. 43 wt % deionized (D.I.) water, based on the weight of H40 and Unoxol Diol, was added and the mixture was stirred for another 5 minutes to form an aqueous dispersible dendritic polymer solution with solid content about 70%.

The weight ratios of Boltorn H40:Unoxol Diol used in Examples 1A to 1F, the particle sizes of the dendritic polymer in the aqueous dispersible solution and the viscosity of the aqueous dispersible solutions are tabulated in Table 1 below.

TABLE 1

| Examples | Weight Ratio (Boltorn H40:Unoxol Diol) | Particle Size (nm) | Viscosity (cps) |
|---|---|---|---|
| 1A | 1:9 | 182 | 54 |
| 1B | 1:4 | 294 | 72 |
| 1C | 1:2 | 374 | 90 |
| 1D | 1:1 | 624 | 178 |
| 1E | 2:1 | 797 | 416 |
| 1F | 4:1 | 909 | 1106 |

FIG. 1a is a photograph showing the aqueous dispersible dendritic polymer solutions corresponding to Examples 1A to 1F, as seen from left to right respectively. It can be observed from FIG. 1a that the solutions range from transparent to slightly milky in appearance. In particular, it can be observed that as the weight proportion of the dendritic polymer increased, the polymer solution became less clear.

Figure 1B:
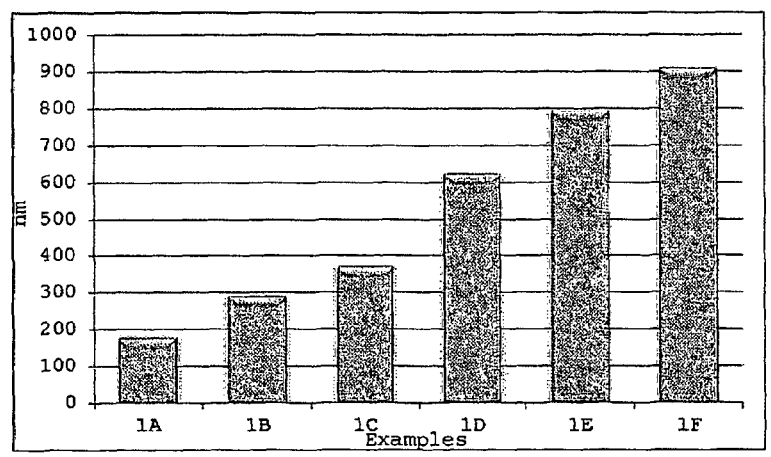
FIG. 1b shows a graph of particle size in nanometers (nm) of the aqueous dendritic polymer dispersion obtained from Examples 1A to 1F.

FIG. 1b shows a graph of particle size in nanometers (nm) of the aqueous dispersible dendritic polymer solution obtained from Examples 1A to 1F. It can be seen from Table 1 and FIG. 1b that the particle size of the dendritic polymer in the aqueous dispersible solution increases with a decrease in the weight proportion of the polar compound (i.e., Unoxol Diol), in the solution.

Figure 1C:
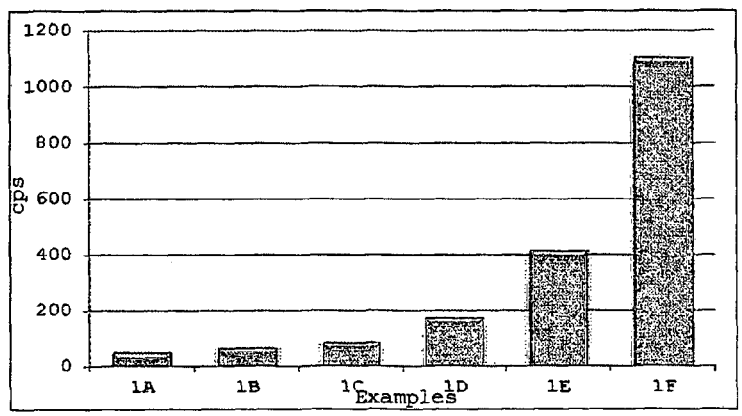
FIG. 1c shows a graph of viscosity in centipoise (cps) of the aqueous dendritic polymer dispersion obtained from Examples 1A to 1F.

FIG. 1c shows a graph of viscosity in centipoise (cps) of the aqueous dispersible dendritic polymer solution obtained from Examples 1A to 1F. It can be seen from FIG. 1c that the viscosity of the aqueous dispersible dendritic polymer solutions increases with a decrease in amount of the polar compound, (i.e. Unoxol Diol) in the dispersion.

Example 2

Preparation of Coating Compositions Based on Aqueous Polymer Compositions of Example 1

The aqueous dispersible dendritic polymer solutions obtained from Examples 1A to 1F were each admixed with a blocked melamine cross-linker (Resimene 747) to form one-component (1K) coating compositions.

All the coatings prepared based on the aqueous polymer solutions of Examples 1A to 1F were capable of film formation in a 1K melamine system. The appearances of the films formed were glossy and smooth. Using the pencil-hardness test, it can be demonstrated that the coatings prepared from the above described 1K melamine systems possess pencil hardness of up to 7H.

Additionally, based on the MEK rub test, it is further demonstrated that the chemical resistance of the above prepared coatings is good, withstanding more than 1500 cycles of MEK rubs.

As illustrative examples, the components of the 1K coating compositions prepared based on the aqueous dispersible dendritic polymer solutions of Example 1A and 1F are provided respectively in Table 2.1 and 2.2 below:

TABLE 2.1

| 1K Preparation Example 2A | WT % |
|---|---|
| Dendritic polymer soulution from Example 1A | 36.7 |
| Water | 12.5 |
| Butanol | 14.9 |
| DPnB | 5.1 |
| Surfynol DF 110C ™ | 0.3 |
| BYK 345 ™ | 0.4 |
| Silquest A-187 ™ | 0.5 |
| Nacure 8924 ™ (blocked acid catalyst) | 0.3 |
| Resimene 747 ™ (melamine crosslinker) | 29.3 |
| Total | 100.0 |

TABLE 2.2

| 1K Preparation Example 2B | WT % |
|---|---|
| Dendritic polymer soulution from Example 1F | 43.7 |
| Water | 4.4 |
| Butanol | 19.6 |
| DPnB | 6.6 |
| Surfynol DF 110C ™ | 0.3 |
| BYK 345 ™ | 0.4 |
| Silquest A-187 ™ | 0.5 |
| Nacure 8924 ™ (blocked acid catalyst) | 0.3 |
| Resimene 747 ™ (melamine crosslinker) | 24.4 |
| Total | 100.2 |

Further, the properties of the 1K melamine coatings prepared based on the solution from Example 1F are provided in Table 3 below.

TABLE 3

| Results | Example 2A | Example 2B |
|---|---|---|
| In-can Appearance | Transparent liquid | Light Milky |
| Dry Film Appearance | Good clarity and smooth | Good clarity and smooth |
| Pencil Hardness, scratch/Break | 3H/4H | 5H/7H |
| MEK Double Rub, cycles | >1500 | >1500 |

Example 2C and 2D show the preparation of dual cure (being heat and UV curable) coating compositions comprising the water-dispersible dendritic polymer solutions of Example 1A and 1F (1A: H40/Unoxol Diol=1:9; 1F: H40/

Unoxol Diol=4:1) in admixture with a blocked melamine cross-linker (Resimene 747™) and a polyester acrylate oligomer (CN 2302™)

The compositions of Examples 2C and 2D are provided in Tables 3.2 and 3.3 respectively.

The dual cure coating compositions from Example 2C and 2D were dried by curing with ultraviolet light for 60 seconds, followed with curing by heating in an oven at 110° C. for 45 min.

Using the pencil hardness test, the dual cured coating possessed a scratch hardness of HB (Example 2C), 4H (Example 2D) and a break hardness of 4H (Example 2C), 6H (Example 2D) as shown in table 3.4.

TABLE 3.2

| 1K Preparation Example 2C | WT % |
|---|---|
| Dendritic polymer solution from Example 1A | 22.4 |
| CN 2302 | 22.3 |
| Water | 18.2 |
| Butanol | 16.8 |
| Surfynol DF 110C ™ | 0.3 |
| BYK 345 ™ | 0.4 |
| Silquest A-187 ™ | 0.5 |
| Irgacure 500 ™ | 0.7 |
| Nacure 8924 ™ (blocked acid catalyst) | 0.3 |
| Resimene 747 ™ (melamine crosslinker) | 17.9 |
| Total | 100.0 |

TABLE 3.3

| 1K Preparation Example 2D | WT % |
|---|---|
| Dendritic polymer solution from Example 1F | 24.6 |
| CN 2302 | 24.6 |
| Water | 22.4 |
| Butanol | 12.3 |
| Surfynol DF 110C ™ | 0.3 |
| BYK 345 ™ | 0.4 |
| Silquest A-187 ™ | 0.5 |
| Irgacure 500 ™ | 0.7 |
| Nacure 8924 ™ (blocked acid catalyst) | 0.3 |
| Resimene 747 ™ (melamine crosslinker) | 13.8 |
| Total | 100.0 |

TABLE 3.4

| Results | Example 2C | Example 2D |
|---|---|---|
| In-can Appearance | Milky White | Milky White |
| Pencil Hardness, scratch/Break | HB/4H | 4H/6H |
| Adhesion, 1 mm × 1 mm | 5% peel off | 0% peel off |
| Flexibility, ⅛" | Passed | Passed |
| MEK Double Rub, cycles | >1500 | >1500 |

Examples 3A to 3F

Preparation of an Aqueous Dispersible Dendritic Polymer Composition

The method described in Examples 1A to 1F was repeated in this Example, except that 1,6-hexanediol was used in place of Unoxol Diol.

The weight ratios of Boltorn H40:1,6-hexanediol used in Examples 3A to 3F, the particle sizes of the dendritic polymer in the aqueous dispersible solution and the viscosity of the aqueous dispersible solutions are detailed in Table 4 below.

TABLE 4

| Examples | Weight Ratio (Boltorn H40:1,6-hexanediol) | Particle Size(nm) | Viscosity (cps) |
|---|---|---|---|
| 3A | 1:9 | 224 | 34 |
| 3B | 1:4 | 329 | 32 |
| 3C | 1:2 | 410 | 98 |
| 3D | 1:1 | 464 | 100 |
| 3E | 2:1 | 616 | 222 |
| 3F | 4:1 | 815 | 700 |

Figure 2A:
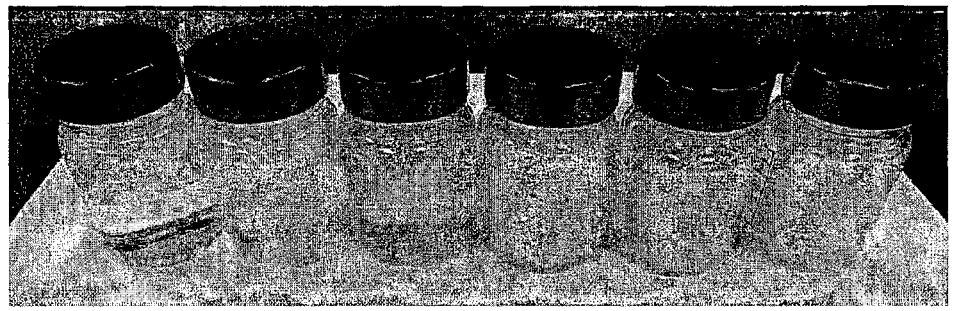
FIG. 2a shows the aqueous dispersible dendritic polymer solutions obtained from Examples 3A to 3F.

FIG. 2a is a photograph showing the aqueous dispersible dendritic polymer solutions corresponding to Examples 3A to 3F, as seen from left to right respectively. It can be observed from FIG. 2a that the solutions range from transparent to milky in appearance.

Figure 2B:
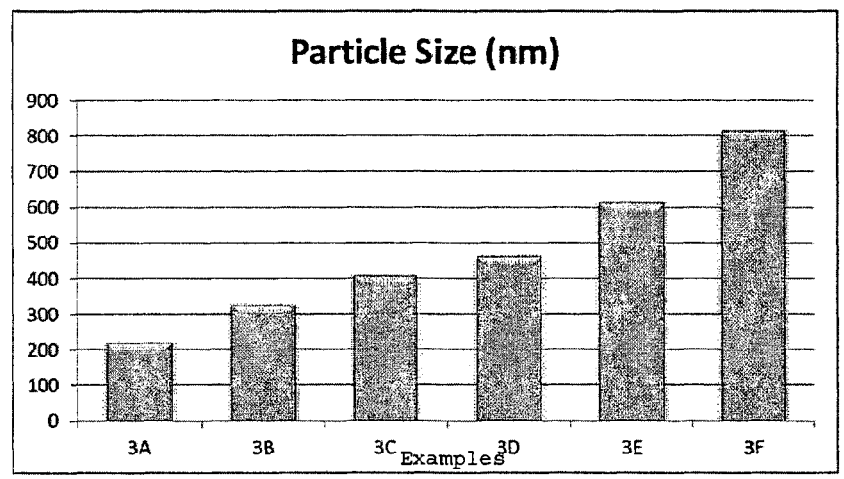
FIG. 2b shows a graph of particle size in nanometers (nm) of the aqueous dispersible dendritic polymer solution obtained from Examples 3A to 3F.

FIG. 2b shows a graph of particle size in nanometers (nm) of the aqueous dispersible dendritic polymer solution obtained from Examples 3A to 3F. It can be seen from Table 4 and FIG. 2b that the particle size of the dendritic' polymer in the aqueous dispersible solution increases with a decrease in amount of the polar compound, i.e. 1,6-hexanediol, in the solution. This is similar to the results shown in Examples 1A to 1F.

Figure 2C:
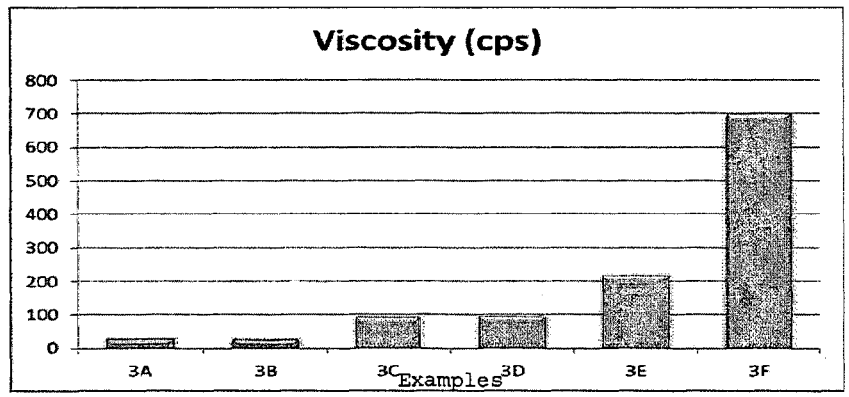
FIG. 2c shows a graph of viscosity in centipoise (cps) of the aqueous dispersible dendritic polymer solution obtained from Examples 3A to 3F.

FIG. 2c shows a graph of viscosity in centipoise (cps) of the aqueous dispersible dendritic polymer solution obtained from Examples 3A to 3F. It can be seen from FIG. 2c that the viscosity of the aqueous dispersible dendritic polymer solution increases with a decrease in amount of the polar amount, i.e. 1,6-hexanediol, in the solution. This is also similar to the results shown in Examples 1A to 1F.

Examples 4A to 4F

Preparation of an Aqueous Dendritic Polymer Composition

The method described in Examples 1A to 1F was repeated in this Example, except that ethylene glycol was used in place of Unoxol Diol.

The weight ratios of Boltorn H40:ethylene glycol used in Examples 4A to 4F, the particle sizes of the dendritic polymer in the aqueous dispersible solutions and the viscosity of the aqueous dispersible solutions are detailed in Table 5 below.

TABLE 5

| Examples | Weight Ratio (Boltorn H40:ethylene glycol) | Particle Size (nm) | Viscosity (cps) |
|---|---|---|---|
| 4A | 1:9 | 263 | 12 |
| 4B | 1:4 | 486 | 16 |
| 4C | 1:2 | 562 | 24 |
| 4D | 1:1 | N.A. | 856 |

TABLE 5-continued

| Examples | Weight Ratio (Boltorn H40:ethylene glycol) | Particle Size (nm) | Viscosity (cps) |
|---|---|---|---|
| 4E | 2:1 | N.A. | 11362 |
| 4F | 4:1 | N.A. | Gelled |

Figure 3A:
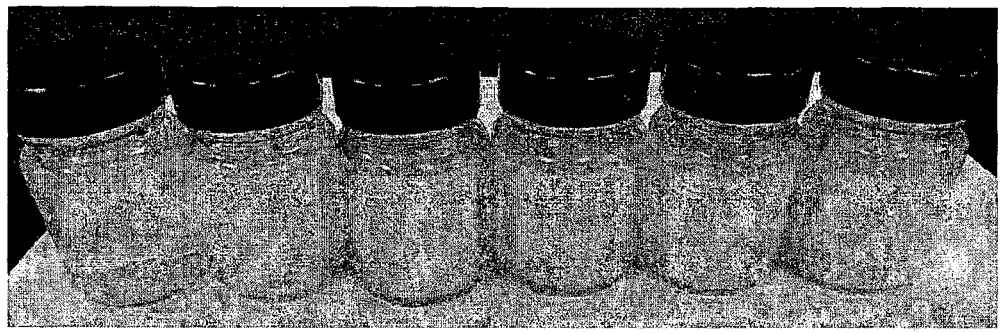
FIG. 3a shows the aqueous dispersible dendritic polymer solutions obtained from Examples 3A to 3F.

FIG. 3a shows the aqueous dispersible dendritic polymer solutions obtained from Examples 4A to 4F, as seen from left to right respectively. It can be observed from FIG. 3a that the solutions range from translucent to milky in appearance.

Figure 3B:
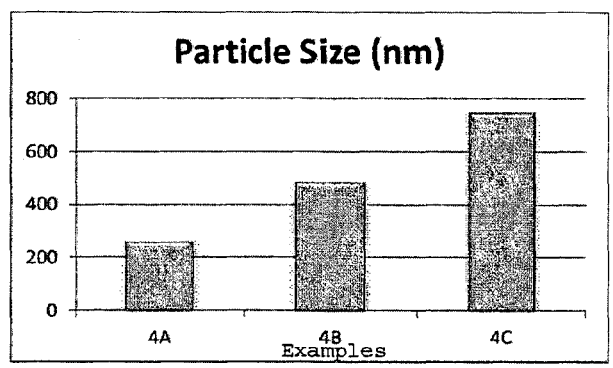
FIG. 3b shows a graph of particle size in nanometers (nm) of the aqueous dispersible dendritic polymer solution obtained from Examples 4A to 4C.

FIG. 3b shows a graph of particle size in nanometers (nm) of the aqueous dispersible dendritic polymer solutions obtained from Examples 4A to 4C.

Figure 3C:
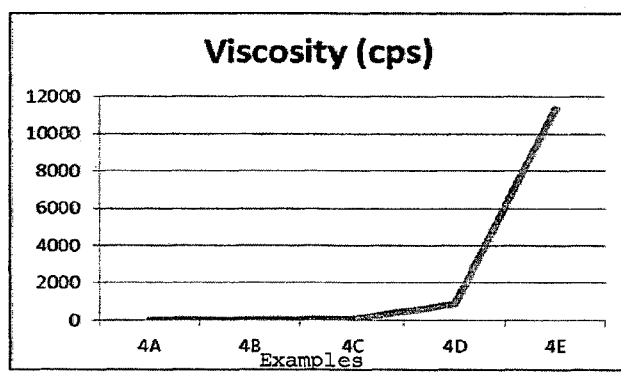
FIG. 3c shows a graph of viscosity in centipoise (cps) of the aqueous dispersible dendritic polymer solution obtained from Examples 4A to 4E.

FIG. 3c shows a graph of viscosity in centipoise (cps) of the aqueous dispersible dendritic polymer solutions obtained from Examples 4A to 4E. Notably, the viscosity of Example 4F was too high and experienced gelation.

Examples 5A to 5F

Preparation of an Aqueous Dendritic Polymer Composition

The method described in Examples 1A to 1F was repeated in this Example, except that polyethylene glycol 400 (PEG) was used in place of Unoxol Diol.

The weight ratios of Boltorn H40:PEG used in Examples 5A to 5F, the particle sizes of the dendritic polymer in the aqueous dispersible solution and the viscosity of the aqueous dispersible solutions are detailed in Table 6 below.

TABLE 6

| Examples | Weight Ratio (Boltorn H40:PEG) | Particle Size (nm) | Viscosity (cps) |
|---|---|---|---|
| 5A | 1:9 | 169 | 32 |
| 5B | 1:4 | 236 | 48 |
| 5C | 1:2 | 475 | 102 |
| 5D | 1:1 | 608 | 108 |
| 5E | 2:1 | 1050 | 624 |
| 5F | 4:1 | N.A. | 1076 |

Figure 4A:
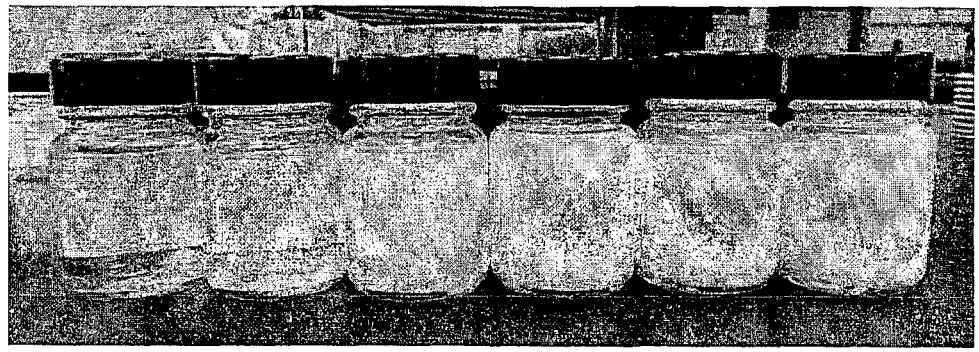
FIG. 4a shows the aqueous dispersible dendritic polymer solutions obtained from Examples 5A to 5F.

FIG. 4a shows the aqueous dispersible dendritic polymer solutions obtained from Examples 5A to 5F, as seen from left to right respectively. It can be observed from FIG. 4a that the solutions range from translucent to milky in appearance.

Figure 4B:
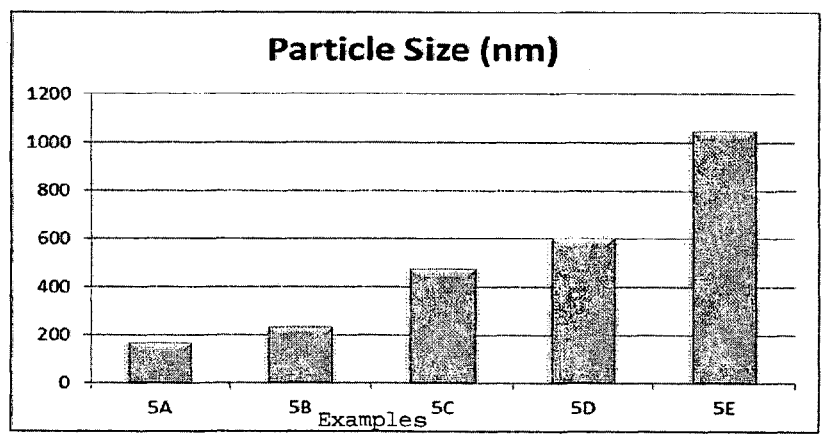
FIG. 4b shows a graph of particle size in nanometers (nm) of the aqueous dispersible dendritic polymer solution obtained from Examples 5A to 5E.

FIG. 4b shows a graph of particle size in nanometers (nm) of the aqueous dispersible dendritic polymer solution obtained from Examples 5A to 5E.

Figure 4C:
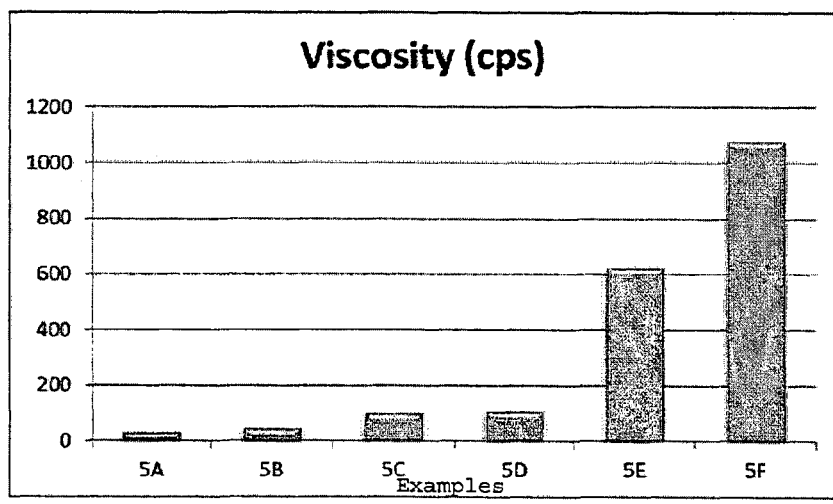
FIG. 4c shows a graph of viscosity in centipoise (cps) of the aqueous dispersible dendritic polymer solution obtained from Examples 5A to 5F.

FIG. 4c shows a graph of viscosity in centipoise (cps) of the aqueous dispersible dendritic polymer solution obtained from Examples 5A to 5F.

Example 5G

Preparation of Coating Composition Based on the Water-Dispersible Dendritic Polymer Solution of Example 5

The example is the 1K preparation of the coating composition comprising the water-dispersible dendritic polymer solution of Example 5F (H40/PEG 400=4:1) in admixture with a blocked melamine cross-linker (Resimene 747™).

The composition is provided in Table 6.1 and the characterization results of the coating are provided in Table 6.2 below.

TABLE 6.1

| 1K Preparation Example | WT % |
|---|---|
| Dendritic polymer solution from Example 5F | 52.1 |
| Water | 11.6 |
| Butyl Glycol (coalescent) | 11.9 |
| Surfynol DF 110C ™ | 0.3 |
| BYK 345 ™ | 0.3 |
| Nacure 8924 ™ (blocked acid catalyst) | 0.3 |
| Resimene 747 ™ (melamine crosslinker) | 23.5 |
| Total | 100.0 |

TABLE 6.2

| Results | Example 5G |
|---|---|
| In-can Appearance | Light Milky |
| Dry Film Appearance | Good clarity and smooth |
| Pencil Hardness, scratch/Break | 3H/5H |
| MEK Double Rub, cycles | >1500 |

Example 6

Preparation of an Aqueous Dendritic Polymer Composition

The method described in Examples 1A to 1F was repeated in this Example, except that lactic acid was used in place of Unoxol Diol.

The weight ratios of Boltorn H40:lactic acid used in Examples 6A to 6F, the particle sizes of the dendritic polymer in the aqueous dispersible solution and the viscosity of the aqueous dispersible solutions are detailed in Table 7 below.

TABLE 7

| Examples | Weight Ratio (Boltorn H40:lactic acid) | Particle Size (nm) | Viscosity (cps) |
|---|---|---|---|
| 6A | 1:9 | 308.3 | 12 |
| 6B | 1:4 | 486.4 | 16 |
| 6C | 1:2 | 788.7 | 24 |
| 6D | 1:1 | 821.7 | 58 |
| 6E | 2:1 | 955.4 | 204 |
| 6F | 4:1 | N.A. | 758 |

Figure 5A:
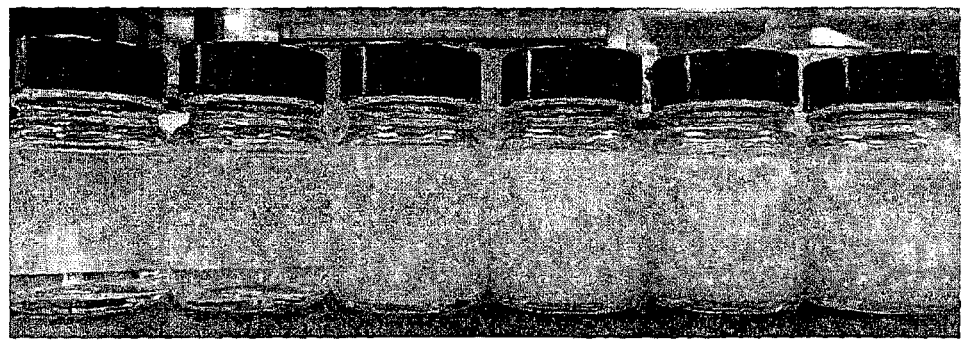
FIG. 5a shows the aqueous dispersible dendritic polymer solutions obtained from Examples 6A to 6F.

FIG. 5a shows the aqueous dispersible dendritic polymer solutions obtained from Examples 6A to 6F, as seen from left to right respectively. It can be observed from FIG. 5a that the solutions range from translucent to milky in appearance.

Figure 5B:
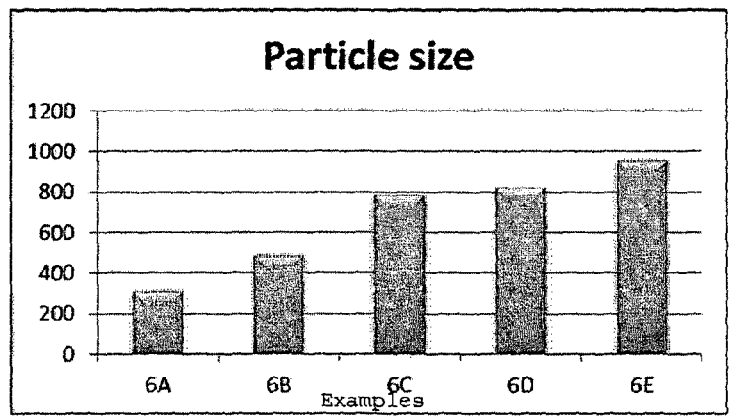
FIG. 5b shows a graph of particle size in nanometers (nm) of the aqueous dispersible dendritic polymer solution obtained from Examples 6A to 6E.

FIG. 5b shows a graph of particle size in nanometers (nm) of the aqueous dispersible dendritic polymer solution obtained from Examples 6A to 6E.

Figure 5C:
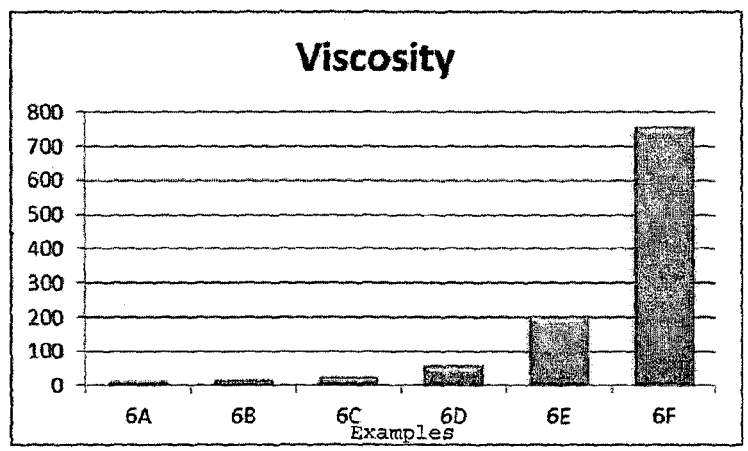
FIG. 5c shows a graph of viscosity in centipoise (cps) of the aqueous dispersible dendritic polymer solution obtained from Examples 6A to 6F.

FIG. 5c shows a graph of viscosity in centipoise (cps) of the aqueous dispersible dendritic polymer solution obtained from Examples 6A to 6F.

Examples 7A to 7F

Preparation of an Aqueous Dendritic Polymer Composition

The method described in Examples 1A to 1F was repeated in this Example, except that a lower functionality dendritic polymer (Boltorn H20) was used in place of Boltorn H40.

The weight ratios of Boltorn H20:Unoxol Diol used in Examples 7A to 7F, the particle sizes of the dendritic polymer in the aqueous dispersible solution and the viscosity of the aqueous dispersible solutions are detailed in Table 8 below.

TABLE 8

| Examples | Weight Ratio (Boltorn H20:Unoxol Diol) | Particle Size (nm) | Viscosity (cps) |
|---|---|---|---|
| 7A | 1:9 | 190 | 40 |
| 7B | 1:4 | 255 | 55 |
| 7C | 1:2 | 389 | 59 |
| 7D | 1:1 | 661 | 83 |
| 7E | 2:1 | 857 | 161 |
| 7F | 4:1 | 1020 | 204 |

Figure 6A:
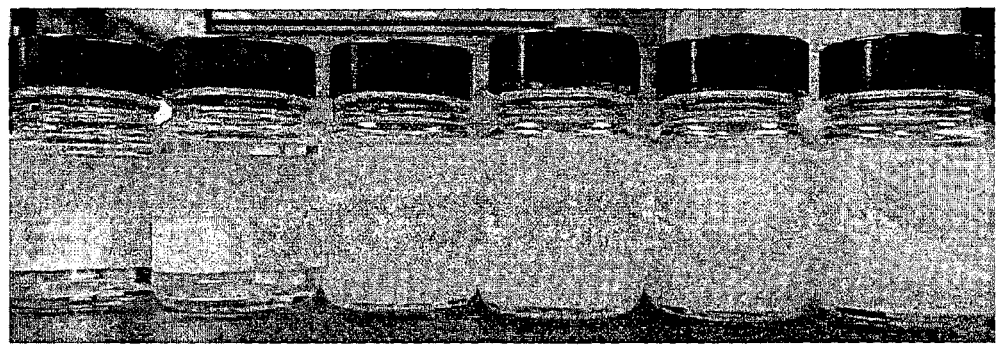
FIG. 6a shows the aqueous dispersible dendritic polymer solutions obtained from Examples 7A to 7F.

FIG. 6a shows the aqueous dispersible dendritic polymer solutions obtained from Examples 7A to 7F, as seen from left to right respectively. It can be observed from FIG. 6a that the solutions range from transparent to milky in appearance.

Figure 6B:
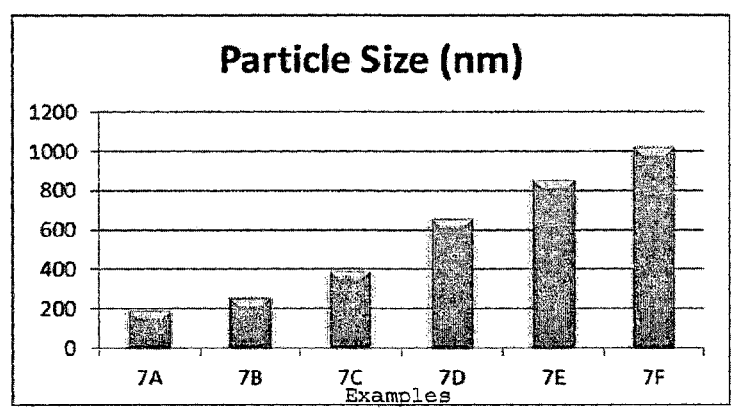
FIG. 6b shows a graph of particle size in nanometers (nm) of the aqueous dispersible dendritic polymer solution obtained from Examples 7A to 7F.

FIG. 6b shows a graph of particle size in nanometers (nm) of the aqueous dispersible dendritic polymer solution obtained from Examples 7A to 7F.

Figure 6C:
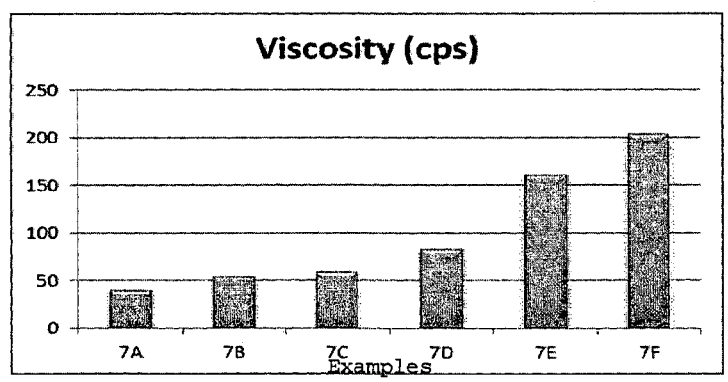
FIG. 6c shows a graph of viscosity in centipoise (cps) of the aqueous dispersible dendritic polymer solution obtained from Examples 7A to 7F.

FIG. 6c shows a graph of viscosity in centipoise (cps) of the aqueous dispersible dendritic polymer solution obtained from Examples 7A to 7F.

Example 8

Preparation of coating composition based on Example 7
The aqueous dispersible dendritic polymer solutions obtained from Examples 7A to 7F were each admixed with a blocked melamine cross-linker (Resimene 747) to form one-component (1K) coating compositions.

All of Examples 7A to 7F were capable of film formation in a 1K melamine system. The appearances of the films formed were glossy and smooth. Using the pencil-hardness test, test results show that the coatings prepared based on the polymer solutions of Example 7 displayed a pencil hardness of up to 6H. It is noted that the pencil hardness of Example 8 is slightly lower than the 1K melamine coatings of Example 2. This is presumably because Boltorn H20 is a lower functionality dendritic polymer as compared to Boltorn H40.

Additionally, using the MEK rub test, the chemical resistance of the 1K melamine system was more than 1500 cycles.

By way of example, the 1K coating compositions prepared based on the aqueous dispersible dendritic polymer solutions of Example 7A (H20:Unoxol Diol=1:9) and Example 7F (H20:Unoxol Diol=4:1) are provided respectively in Tables 9 and 10 below

TABLE 9

| Name | Weight (%) |
|---|---|
| Polymer solution from Example 7A | 39.7 |
| Water | 11.7 |
| Butyl Glycol (coalescent) | 15.9 |
| Additive (BYK 345 ™) | 0.3 |
| Blocked Acid Catalyst (Nacure 8924 ™) | 0.2 |
| Melamine Crosslinker (Resimene 747 ™) | 32.2 |
| Total | 100.0 |

TABLE 10

| Name | Weight (%) |
|---|---|
| Polymer solution from Example 7F | 46.3 |
| Water | 11.4 |
| Butyl Glycol | 13.9 |
| Additive (BYK 345 ™) | 0.4 |
| Blocked Acid Catalyst (Nacure 8924 ™) | 0.3 |
| Melamine Crosslinker (Resimene 747 ™) | 27.8 |
| Total | 100.0 |

Further, the properties of the 1K melamine coatings prepared based on the solutions from Examples 7A and 7F are provided in Table 11 below.

TABLE 11

| Properties | Composition based on solution of Example 7A | Composition based on solution of Example 7F |
|---|---|---|
| In-can Appearance | Transparent liquid | Light Milky |
| Dry Film Appearance | Clear and smooth | Clear and smooth |
| Pencil Hardness, Scratch/break | 3H/6H | 4H/6H |
| MEK Double Rub, No. of cycles | >1500 | >1500 |

Examples 9A to 9F

Preparation of an Aqueous Dendritic Polymer Composition

The method described in Examples 7A to 7F was repeated in this Example, except that polyethylene glycol 400 (PEG) was used in place of Unoxol Diol.

The weight ratios of Boltorn H20:PEG 400 used in Examples 9A to 9F, the particle sizes of the dendritic polymer in the aqueous dispersible, solution and the viscosity of the aqueous dispersible solutions are detailed in Table 12 below.

TABLE 12

| Examples | Weight Ratio (Boltorn H20:PEG) | Particle Size (nm) | Viscosity (cps) |
|---|---|---|---|
| 9A | 1:9 | 353 | 22 |
| 9B | 1:4 | 654 | 38 |
| 9C | 1:2 | 801 | 68 |
| 9D | 1:1 | 1165 | 196 |
| 9E | 2:1 | 1228 | 1228 |
| 9F | 4:1 | 1749 | 1749 |

Figure 7A:
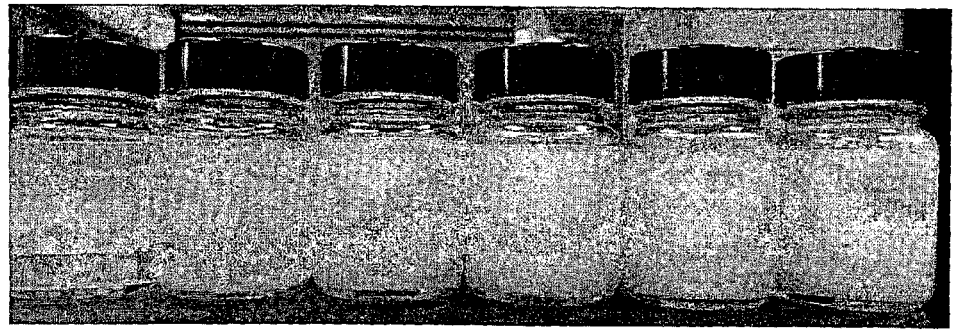
FIG. 7a shows the aqueous dispersible dendritic polymer solutions obtained from Examples 9A to 9F.

FIG. 7a shows the aqueous dispersible dendritic polymer solutions obtained from Examples 9A to 9F, as seen from left to right respectively. It can be observed from FIG. 7a that the solutions range from transparent to milky in appearance.

Figure 7B:
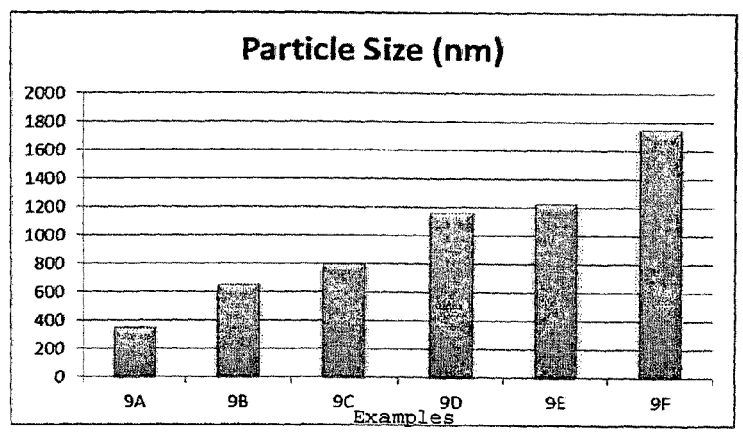
FIG. 7b shows a graph of particle size in nanometers (nm) of the aqueous dispersible dendritic polymer solution obtained from Examples 9A to 9F.

FIG. 7b shows a graph of particle size in nanometers (nm) of the aqueous dispersible dendritic polymer solution obtained from Examples 9A to 9F.

Figure 7C:
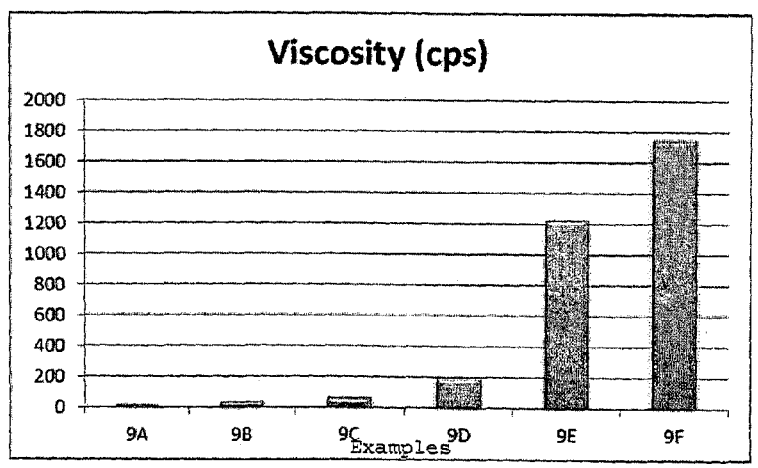
FIG. 7c shows a graph of viscosity in centipoise (cps) of the aqueous dispersible dendritic polymer solution obtained from Examples 9A to 9F.

FIG. 7c shows a graph of viscosity in centipoise (cps) of the aqueous dispersible dendritic polymer solution obtained from Examples 9A to 9F.

Example 10

Preparation of 2K Coating Composition by Blending with a Polyurethane Dispersion (PUD)

Example 10 shows a 2K preparation of a coating composition comprising a blend of the water-dispersible dendritic polymer solution of Example 1A (1A: H40/Unoxol Diol 1:9) and PUD 163P in admixture with a polyisocyanate cross-linker (Easaqua DX 803™).

Two coating compositions were prepared, namely, Examples 10A and 10B. Example 10B contains a an additional PUD component for blending with the dendritic polymer solution. The compositions of Example 10A and 10B are provided in Tables 11.1 and Table 11.2 respectively.

TABLE 11.1

| 2K coating composition Example 10A | WT, % |
|---|---|
| Side A | |
| Dendritic polymer solution of Example 1A | 11.69 |
| Water | 7.18 |
| Dowanol PnB | 1.98 |
| BYK 345 | 0.72 |
| Surfynol DF-110C | 0.32 |
| 1% DBTDL in PnB | 2.08 |
| Ecosurf BD405 | 0.69 |
| Side B | |
| Easaqua DX803 | 75.24 |
| Total | 100.00 |

TABLE 11.2

| Example 10B | WT, % |
|---|---|
| Side A | |
| Dendritic polymer solution of Example 1A | 7.04 |
| Water | 25.01 |
| PUD 163P | 20.84 |
| BYK 345 | 0.42 |
| Surfynol DF-110C | 0.17 |
| 1% DBTDL in PnB | 1.25 |
| Side B | |
| Easaqua DX803 | 45.28 |
| Total | 100.00 |

The characterization results of the coatings prepared from Examples 10A and 10B are tabulated below and shown in comparison to a convention polyurethane coating.

TABLE 11.3

| Results | Example 10A | Example 10B | PUD 163P |
|---|---|---|---|
| In-can Appearance | Slight hazy | Milky white | Translucent |
| Dry Film Appearance | Clear & Glossy | Clear & Glossy | Clear & Glossy |
| Pencil Hardness, scratch/Break | F/6H | 2H/5H | HB/4H |
| Impact, In. lb | >80 | >80 | >80 |
| Flexibility, 1/8" | Pass | Pass | Pass |
| MEK Double Rub, cycles | >1500 | 644 | <10 |
| Water, 24 hrs | Very slight blistering (recover in 40 min) | No change | Blistering |
| 5% NaOH Solution, 24 hrs | No change | No change | Whitening and cracking |

TABLE 11.3-continued

| Results | Example 10A | Example 10B | PUD 163P |
|---|---|---|---|
| 50% Ethanol, 1 hr | No change | Tiny blister | Blistering |

Comparative Example 11

Preparation of a Carboxy-Terminated Dendritic Polymer

Comparative Example 11 refers to a conventional aqueous dispersible dendritic polymer that has been functionalized with ionic functional groups for acquiring solubility in an aqueous medium.

Boltorn H40 and about 50% wt N-methyl-2-pyrrolidone (NMP) based on Boltorn H40 were mixed in a 100 ml round bottom flask with reflux. Stirring was undertaken at 90° C. for an hour until the mixture turned homogeneous. To the stirred mixture, maleic anhydride was quantitatively added until about 30% of the hydroxyl functional groups of the Boltorn H40 have been substituted respectively. The temperature is then raised to 100° C. and stirring is continued for another 60 minutes. After that, the mixture is cooled to 65° C., followed by the addition of triethylamine ("TEA") to neutralize all acid groups and deionised (DI) water to adjust solid content. Mixture is stirred for another 15 minutes. The final product is then cooled to room temperature and filtered with a 25 μm filter cloth.

The final product is a carboxyl group functionalized H40 dendritic polymer solution, having about 25% of its —OH groups substituted with —COOH groups, an —OH equivalent weight (Ew) of about 440 and solid content of about 55.4%. The polymer solution is a nearly clear yellow liquid.

Table 12.1 below shows a 1K preparation of a coating composition based on the carboxyl functionalized polymer solution of Comparative Example 11.

TABLE 12.1

| Coating Composition prepared from dendritic polymer solution of Example 11 | Wt % |
|---|---|
| 30% COOH modified H40 | 68.5 |
| Water | 8.9 |
| Butyl Glycol (coalescent) | 8.9 |
| BYK 345 | 0.4 |
| Nacure 8924 | 0.4 |
| Resimene 7103 | 12 |
| Total | 99.9 |

The characterization results of the coating of Table 12.1 are provided in Table 12.2 below.

TABLE 12.2

| Results | Comparable Example |
|---|---|
| In-can Appearance | Light Milky |
| Dry Film Appearance | Hazy and uneven, poor appearance |
| | Drying condition: 110° C./45 min |
| | 100μ WFT on Tin |
| Pencil Hardness, scratch/Break | 2B/2B |
| Adhesion, 1 mm × 1 mm | 21% peel off |
| Impact, In. lb | 10 |
| Flexibility, 1/8" | Failed |

TABLE 12.2-continued

| Results | Comparable Example |
|---|---|
| | 100µ WFT on Glass |
| Pencil Hardness, scratch/Break | 4B/4B |

As can be seen above, while conventional dendritic polymer (functionalized with carboxyl groups) may help to disperse the dendritic polymer in water, the presence of carboxyl functional groups result in inferior coating performance when applied in a 1K melamine coating system. The dry film coating has an uneven surface and causes poor aesthetic appearance. Additionally, the measured pencil hardness is only 2B on the surface of a tin panel and 4B on a glass panel. This is clearly contrasted with the hardness of 5H/6H provided by the disclosed coatings of the present invention.

Applications

It will be appreciated that the disclosed polymer compositions and methods can be used to prepare water-based coating compositions which are organic solvent-free and accordingly emit little or no volatile organic compounds at all.

It can be further appreciated that the disclosed aqueous dispersible compositions are easy to prepare, without requiring a cumbersome modification step to graft ionic moieties onto the peripheral surface of the polymer. As a result, the disclosed polymer compositions can be used to prepare water-based coatings having high pencil hardness and improved chemical/water resistance compared to conventional water-based coatings that utilize ionic-functionalized polymers. As an added advantage, by not requiring any additional surface modification of the polymers, there can be significant cost and time savings when preparing the water-based coatings.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. An aqueous dispersible polymer composition consisting essentially of:
   (i) a hydroxyl functional dendritic polymer, wherein the hydroxyl functional dendritic polymer is completely unmodified; and
   (ii) one or more polar compounds comprising one or more polar functional groups selected from the groups consisting of: hydroxyl functional group, amino functional group, halogen functional group, carbonyl functional group and carboxyl functional group, said polar compounds being miscible with both said hydroxyl functional dendritic polymer and an aqueous solvent; and wherein the weight ratio of said hydroxyl functional dendritic polymer to said polar compounds is from about 1:9 to about 4:1.

2. The aqueous dispersible polymer composition of claim 1, wherein said composition further comprises said aqueous solvent.

3. The aqueous dispersible polymer composition according to claim 1, wherein said or more polar compounds are selected from the group consisting of: alcohols, carboxylic acids, halogenated alkyls, halogenated olefins, amines, alkylamines, alkenylamines, olefinic alcohols, cycloalkyl alcohol, cycloalkenyl alcohol, hydroxy acid and mixtures thereof.

4. The aqueous dispersible polymer composition according to claim 1, further comprising one or more cross-linkers.

5. The aqueous dispersible polymer composition according to claim 1, wherein said hydroxyl functional dendritic polymer has a theoretical number of 16 to 128 hydroxyl groups per molecule of said dendritic polymer.

6. The aqueous dispersible polymer composition according to claim 5, wherein said hydroxyl functional dendritic polymer has a theoretical number of 64 hydroxyl groups per molecule of said dendritic polymer.

7. A single component (1K) coating composition comprising the aqueous dispersible polymer composition according to claim 1 and one or more crosslinkers in a single component.

8. A two-part (2K) coating composition comprising the aqueous dispersible polymer composition according to claim 1 in one component and one or more crosslinkers in the other component.

9. A coating composition comprising a first component and second component, wherein said first component consists essentially of:
   (i) at least one hydroxyl functional dendritic polymer, wherein the hydroxyl functional dendritic polymer is completely unmodified;
   (ii) one or more polar compounds comprising one or more polar functional groups selected from the groups consisting of: hydroxyl functional group, amino functional group, halogen functional group, carbonyl functional group and carboxyl functional group, said polar compounds being miscible with both said hydroxyl functional dendritic polymer and an aqueous solvent;
   (iii) an aqueous solvent; and
said second component comprising:
   (iv) one or more cross-linkers; and
wherein said first and second components, when mixed together, form the coating composition,
wherein the weight ratio of said hydroxyl functional dendritic polymer to said polar compounds is from about 1:9 to about 4:1.

10. A process for preparing an aqueous dispersible polymer composition, said process comprising the steps of
   (a) mixing a hydroxyl functional dendritic polymer, one or more polar compounds in an aqueous solvent to form said aqueous dispersible polymer composition, said one or more polar compounds being selected to be miscible with both said hydroxyl functional dendritic polymer and said aqueous solvent; wherein the hydroxyl functional dendritic polymer is completely unmodified, wherein said one or more polar compounds comprise one or more polar functional groups selected from the groups consisting of: hydroxyl functional group, amino functional group, halogen functional group, carbonyl functional group and carboxyl functional group, and wherein the weight ratio of said hydroxyl functional dendritic polymer to said polar compounds is from about 1:9 to about 4:1.

11. The process according to claim 10, wherein said mixing step is performed at a temperature of about 20° C. to about 200° C.

12. The process according to claim 10, wherein said mixing step comprises physical blending.

13. The process of claim 10, wherein the hydroxyl functional dendritic polymer has a theoretical number of 16 to 128 hydroxyl groups per molecule of said polymer.

14. The process of claim 10, wherein the hydroxyl functional dendritic polymer has a theoretical number of 16 to 64 hydroxyl groups per molecule of said polymer.

15. The process of claim 10, wherein the hydroxyl functional dendritic polymer has a theoretical number of 32 to 64 hydroxyl groups per molecule of said polymer.

16. The process of claim 10, wherein the hydroxyl functional dendritic polymer has a theoretical number of 32 hydroxyl groups per molecule of said polymer.

17. The process of claim 10, wherein the hydroxyl functional dendritic polymer has a theoretical number of 64 hydroxyl groups per molecule of said polymer.

18. The process of claim 10, wherein the polar compound is selected from the group consisting of an alcohol, diol, polyol, and a hydroxyl substituted aliphatic carboxylic acid.

19. The process of claim 10, further comprising contacting the aqueous dispersion of a hydroxyl functional dendritic polymer with one or more cross-linkers.

20. The aqueous dispersible polymer composition of claim 1, wherein the one or more polar compounds are selected from the group consisting of 1,6-hexanediol, lactic acid, ethylene glycol, polyethylene glycol and a mixture of (cis, trans) 1,3 cyclohexanedimethanol and (cis, trans) 1,4-cyclohexanedimethanol)diol.

21. The coating composition of claim 9, wherein the one or more polar compounds are selected from the group consisting of 1,6-hexanediol, lactic acid, ethylene glycol, polyethylene glycol and a mixture of (cis, trans) 1,3 cyclohexanedimethanol and (cis, trans) 1,4-cyclohexanedimethanol)diol.

22. The process of claim 10, wherein the one or more polar compounds are selected from the group consisting of 1,6-hexanediol, lactic acid, ethylene glycol, polyethylene glycol and a mixture of (cis, trans) 1,3 cyclohexanedimethanol and (cis, trans) 1,4-cyclohexanedimethanol)diol.

* * * * *